Dec. 12, 1950

G. W. WILLARD
INTERMITTENTLY ENGAGED CLUTCH
VARIABLE POWER TRANSMISSION 2,534,093

Filed May 19, 1947

INVENTOR.
GEORGE W. WILLARD
BY
Shoedling and Krost
attys

Dec. 12, 1950 G. W. WILLARD 2,534,093
INTERMITTENTLY ENGAGED CLUTCH
VARIABLE POWER TRANSMISSION
Filed May 19, 1947 3 Sheets-Sheet 2

INVENTOR.
GEORGE W. WILLARD
BY
Woodling and Krost
attys

Dec. 12, 1950  G. W. WILLARD  2,534,093
INTERMITTENTLY ENGAGED CLUTCH
VARIABLE POWER TRANSMISSION
Filed May 19, 1947  3 Sheets-Sheet 3

INVENTOR.
GEORGE W. WILLARD
BY
Woodling and Krost
attys.

Patented Dec. 12, 1950

2,534,093

UNITED STATES PATENT OFFICE 2,534,093

INTERMITTENTLY ENGAGED CLUTCH VARIABLE POWER TRANSMISSION

George W. Willard, Springfield, Mo.

Application May 19, 1947, Serial No. 748,877

15 Claims. (Cl. 74—125.5)

My invention relates generally to power transmission and more particularly to continuous variable speed transmission of power.

Speed and power transmission have occupied the attention of engineers since the industrial revolution. To the layman, the development has been centered in the automotive industry. However, the same transmission problem is met in industry. Prior to the development of the present invention, the variable transmission has generally been accomplished by gear changing mechanism. Of course, as is generally known, gear changing mechanisms cannot begin to provide an infinite variation within a range of speed. On the contrary, they are generally limited to a very few selected speed ratios.

Accordingly, an object of my invention is to provide a variable speed transmission.

Another object of my invention is to convert either reciprocating or rotating motion to oscillatory motion in a plane, and to convert the motion in a plane to oscillatory rotary or continuous rotary motion, and thereafter to convert the oscillatory to continuous rotary motion and transmit any continuous rotary motion as continuous rotary motion.

In actual practice of my invention, I have developed a wide variety of workable variations of my drive transfer mechanism, and in developing these variations I have observed various unexpected improvements over conventional power transmission. Therefore, in the following specification and drawings I have set forth the invention more or less schematically to illustrate and explain the basic principle of operation with no attempt to show specific structural embodiment. Accordingly, other objects of the invention will be apparent from the description and claims, taken in conjunction with the accompanying drawings, in which:

Figure 1A is a diagrammatic illustration of the crank arm movement in relation to pivot point position;

Figure 3:
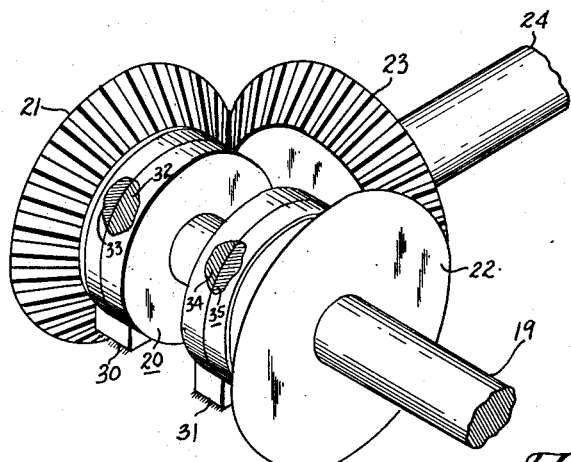
Figure 4:
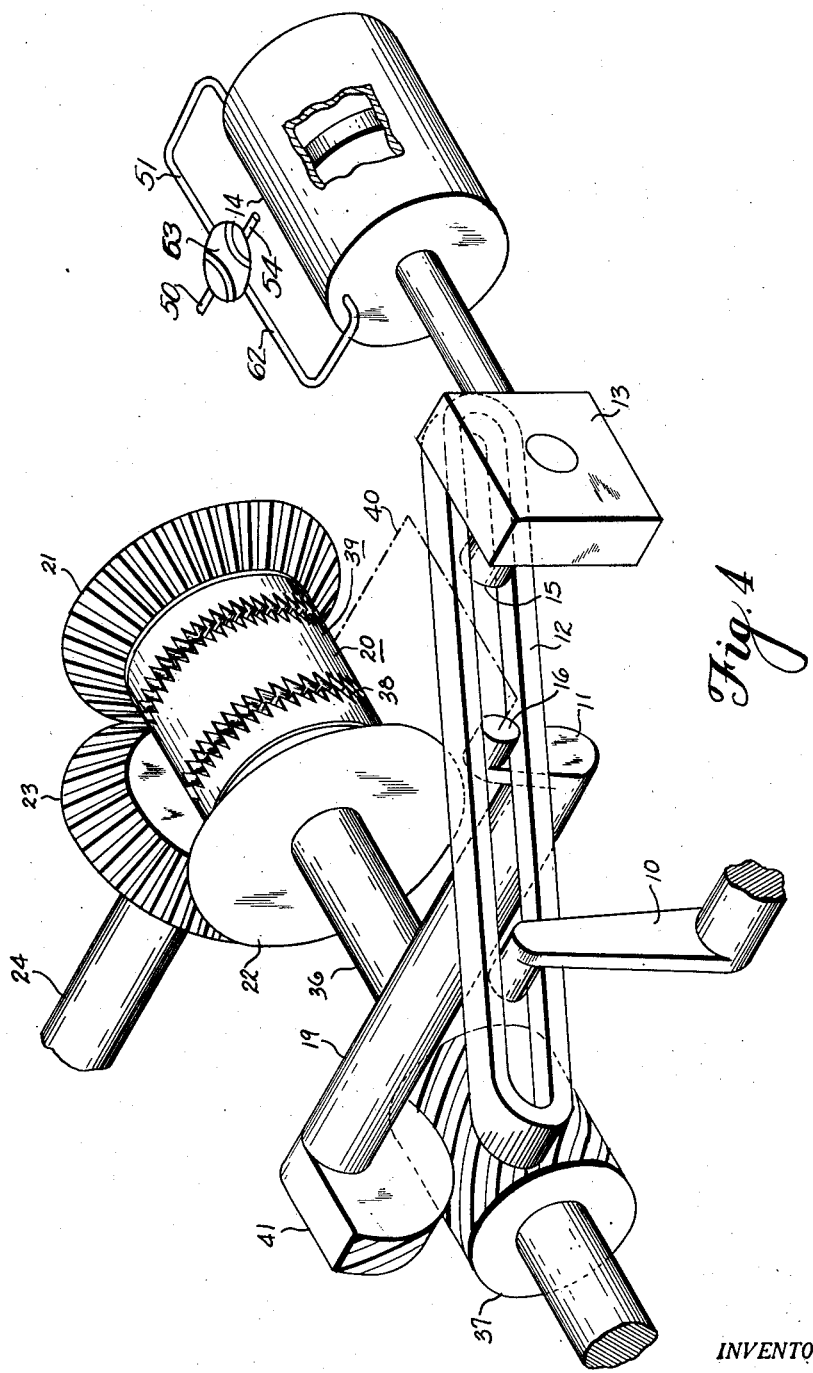

Figure 3 illustrates a third embodiment of the rectifying means employing fluid clutch engagement; and Figure 4 illustrates an embodiment of the driven member wherein the driven member is positioned for oscillatory rotation movement only, and the rectifying means is driven therefrom through a worm and gear arrangement. A mechanical embodiment of the motion rectifying means is illustrated with this embodiment.

Figure 1:
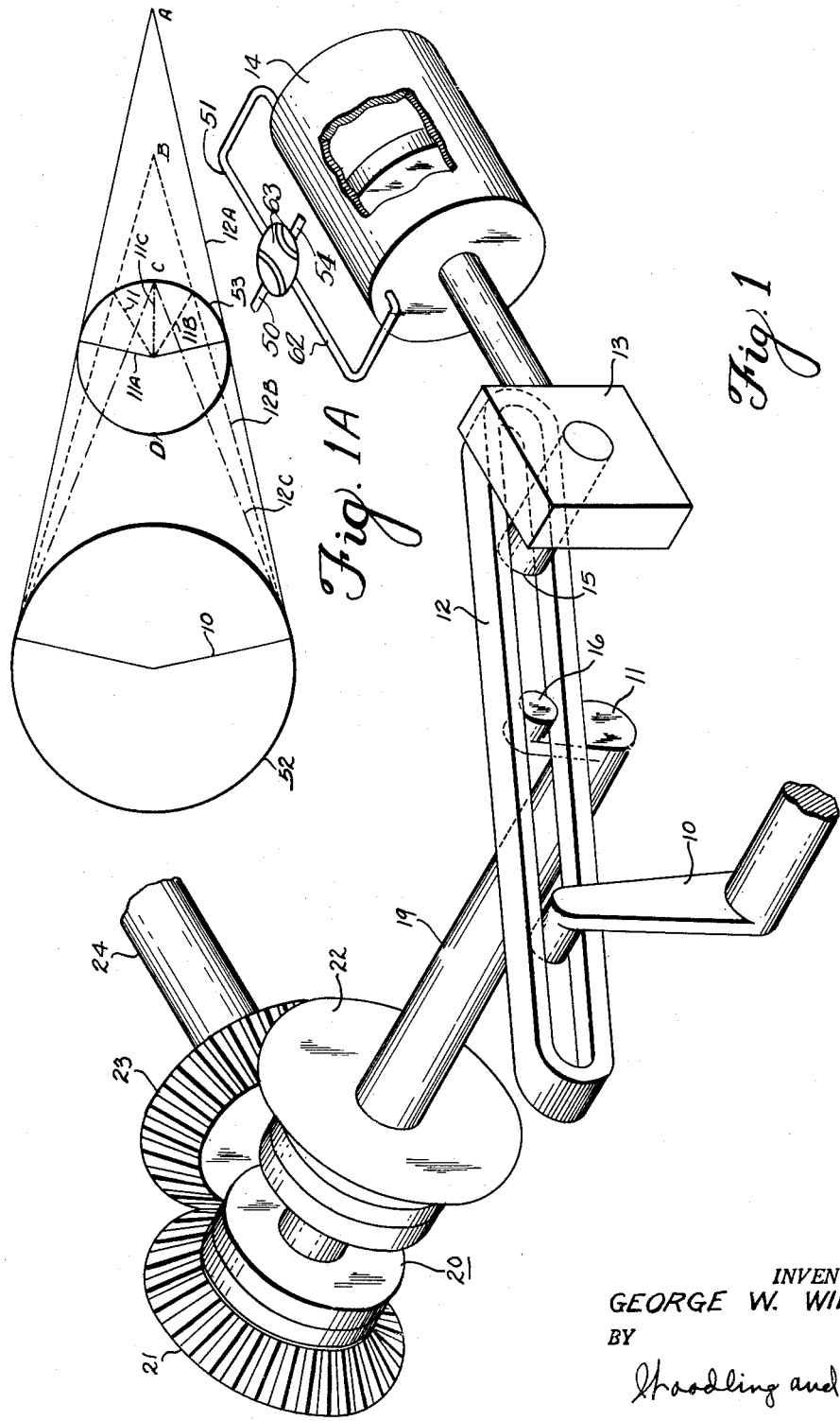
Figure 1 illustrates a driving member and a driven member with a pivotal power link therebetween having a pivot variable relative to the driving and driven means, and also illustrating a motion rectifying means in conjunction with the driven member.

In the Figure 1 of the drawing, I have illustrated the principles of my invention schematically, in that the bearings, housing, and other allied members are not shown. In the Figure 1, I illustrate a driving crank arm 10 which may be driven by any convenient source of power. Although I have illustrated a rotating crank arm, a reciprocating power source to swing the link 12 may be employed. A driven crank arm 11 and an output shaft 19 are spaced a distance from the driving crank arm 10. A power link 12 is provided to link the driving arm 10 and the driven arm 11, and I have provided a shiftable pivot means 13 to pivot the power link 12. Therefore, as the driving crank arm 10 rotates, or oscillates, the power link 12 is pivoted about the pivot means 13, and will cause the crank arm 11 to move. However, the type of movement imparted to the driven crank arm 11 will be dependent upon the arc of swing of the pivot link 12 at the area of interconnection between the crank arm 11 and the pivot link 12. That is, if the distance between the driving crank arm 10 and the pivot means 13 is relatively long, the driven shaft 19 will have a relatively long arc of swing in the area of the driven crank 11. However, if the distance between the crank arm 10 and the pivot means 13 is reduced, the arc of swing will be proportionally decreased in the area of interconnection of the driven crank 11. The pivot 13 moves along a straight line path through the axes of shaft 19 and the driving shaft driving the crank arm 10. Thus, the arcuate path of the driven crank arm 11 will decrease as the pivot 13 approaches the axis of shaft 19, and the crank arm 11 approaches the position of the line through the axes which the pivot 13 follows.

The crank 11 may oscillate with the pin 16 thereof extending either toward or away from the driving crank arm 10. Therefore, when the pin 16 extends away from the crank 10, the arcuate swing thereof will cease when pivot 13 approaches the axis of shaft 19 a distance equal to the length of crank arm 11. That is, when the axis of pins 15 and 16 coincide. On the other hand, when the pin 16 extends toward the crank 10, the arcuate swing thereof will cease when pivot 13 passes the axis of shaft 19 a distance equal to the length of crank arm 11, thereby bringing pins 15 and 16 to coincide. Therefore, I have provided means to shift the position of the pivot means 13. This positioning means, I have illustrated in the form of a cylinder and hydraulic piston 14. Therefore, by suitable hydraulic controls, the pivot means 13 may be positioned relative to the crank arm 10 between a first and a second limit dependent upon a predetermined design of the positioning means 14. Movement or locking of the pivot moving means 14 may be accomplished by any suitable means, either manually controlled or automatic to produce a particular desired resulting type of effect upon the driven crank arm 16 on the shaft 11. However, for the purpose of broadly illustrating this invention, suitable controls for the hydraulic cylinder 14 are illustrated as comprising a fluid line 50 from a suitable pressure source. A fluid line 51 and a fluid line 62 respectively enter into opposite ends of the cylinder 14. A valve 63, either manually operated or automatically controlled, is provided to direct fluid from the line 50 to a selected one of the lines 51 or 62, and simultaneously exhaust fluid from the unselected fluid line 51 or 62 to an exhaust line 54. Also, as illustrated in the Figures 1 and 4 of the drawings, the valve 63 may be positioned to lock fluid on both sides of the piston and thereby prevent any movement of the piston, and consequently hold the pivot locked in a selected position. The power link 12 is relatively wide, and I have illustrated the pin 16 and the pin 15 as extending substantially less than halfway across the link. Therefore, the pin 15 of the pivot means 13 may move past the pin 16, or may be moved to a position substantially axially coextensive therewith.

With the pin 15 positioned axially coextensive with the pin 16, it will readily be seen that the crank arm 11 will be at the pivot point of the power link 12 and therefore will not be driven by the swinging movement of the power link 12, but on the contrary will remain stationary. In a particular adaptation of the apparatus, it may be desired that the variation in speed transfer be from zero to the maximum. In such a case, the described co-axial position of the pin 15 with the pin 16 may be the one extreme limit of movement for the pivot means 13. The other extreme limit would be at a distance from the pin 16, and preferably away from the drive crank arm 10, substantially as illustrated in the Figure 1.

An understanding of the result produced by shifting the pivot means 13 is essential to an understanding of my invention. Therefore, I have set forth an illustrative sketch in Figure 1A to explain the principle of operation. The line 10 represents the crank arm 10. The point of interconnection between the crank arm 10 and the link 12 will describe a circle 52 when the arm 10 rotates.

The line 11 represents the crank arm 11, and the point of interconnection between the pin 16 and the link 12 will describe a circle 53 when the crank arm 11 is continuously rotating.

In order to continuously rotate the crank arm 11, the sketch of Figure 1A indicates that the pivot pin 15 must be positioned relative to the crank arms 10 and 11 in such a manner that the crank arm 10 and 11 are bases of juxtapositioned right triangles having a common vertex, which in the illustration is the pivot pin 15 in position A. Therefore, inertia of the driven parts will carry the crank arm 11 past the perpendicular dead center position illustrated in the Figure 1A and allow the return swing of the link 12 to further rotate the crank arm 11. It is at once apparent, therefore, that the position of the pin 15 and line 12 as illustrated in the full lines 12A in Figure 1A, is the limit to which the pivot may be shifted away from the driving crank arm 10, because a further shift away would tend to increase the swing of the link 12 in the area of interconnection with the arm 11, beyond the length of the arm 11.

The pivot pin 15 may be shifted toward the crank arm 10, and to illustrate a second representative position, I have shown the pin 15 moved to a position B which will cause the link 12 to swing between the limits of the dotted phantom lines indicated by the reference character 12B. In this position, it may be seen that the crank arm 11 will not be able to rotate, because the swing of the link 12 is never to the full length of the crank arm 11. Therefore, the crank arm 11 is obliged to reciprocate between the limits as indicated by the dotted lines 11B. The arc of the circle 53 described by the point of interconnection between the pin 16 and the link 12 on the side of the circle nearest the position A is defined as the minor arc. The remainder of the circle is defined as the major arc. It is entirely possible, of course, to swing the arm 11 in the major arc, or in the minor arc.

A third position C of the pivot pin 15 and the resulting swing of the link 12 is indicated by the dash-dot line 12C. In this position, the arm 12 does not swing relative to the pin 16, but in fact, the pin 16 and the pin 15 are positioned together and are axially coextensive. Therefore, although the driving arm 10 be rotating full speed, the driven arm 11 will remain still. In the event of swinging the arm 11 in the major arc, the pin 15 may move the position D indicated in Figure 1A before the arm 11 will remain still.

In summary, I have provided apparatus whereby an infinitely variable drive may be obtained by the variable positioning of a pivot between a first and second limit, whereby a driving means might be used to swing a power link about the variable pivot through varying degrees of swing to rotatably drive or oscillatorily drive a driven crank arm dependent upon the relative position of the pivot means between its limits.

Although in some installations a reciprocating motion might be useful, it is usually desired to have the output power continuously rotating in one direction. Therefore, I have provided for motion rectifying means 20 to convert oscillatory movement of the shaft 19 into rotary movement, and to transmit rotary movement of the shaft 19 as rotary movement.

More specifically, I have provided for a first bevel gear 21 and a second bevel gear 22. The gears 21 and 22 are journaled upon the shaft 19 and therefore are freely turning with respect to the shaft 19. An output gear 23 is provided in mesh with both of the gears 21 and 22, and is adapted to drive the driven body through shaft 24.

In general, the operation of the rectifying means 20 is to interlock the gear 21 to the shaft 19 when the shaft 19 is rotating in one rotational direction, and to interlock the gear 22 to the shaft 19 is rotating in the oposite rotational direction. Therefore, regardless of which direction the shaft 19 may be rotating, the output gear 23 is always driven in the same direction. Also, if the shaft 19 be rotating continuously in one direction, the one gear will always be interlocked therewith and cause the gear 22 and the driven body 24 to be continuously driven in the same direction. Therefore, regardless of whether or not the shaft 19 is reciprocating or rotating, the driven body 24 will always rotate in one predetermined direction.

Figure 2:
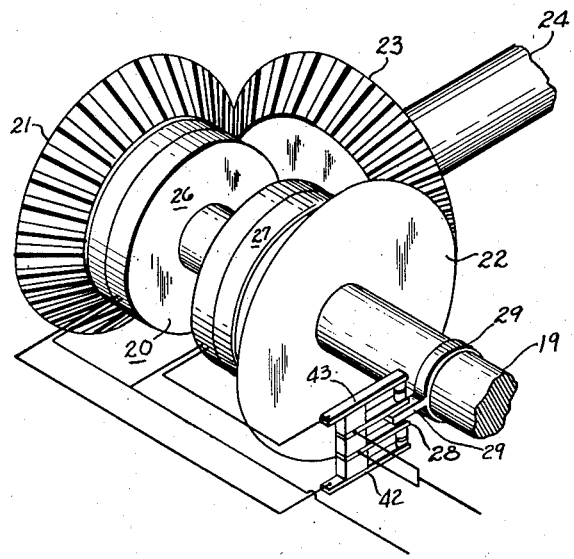
Figure 2 illustrates an alternate rectifying means employing electrical clutch members.

In the Figures 2, 3 and 4, I have illustrated three possible methods of interlocking the gears 21 and 22 in order to convert or transmit the motion of the shaft 19 to the driven body 24. In the Figure 2, I illustrate an electric clutch mechanism. Clutch 26 is adapted to operate with gear 21 and clutch 27 is adapted to operate with gear 22. When electrically energized, the clutch 26 will interlock the gear 21 with the shaft 19, and when energized, the clutch 27 will interlock the gear 22 with the shaft 19. In order to energize the proper clutch 26 or 27 at the proper time, I have provided an electrical switch 28. A drag link 29 encompasses the shaft 19, and is adapted to fit snugly upon the shaft 19 and therefore have a tendency to rotate or oscillate with the shaft 19. However, the fit is snug but not extremely tight. Therefore, the link 29 may be held against rotation by a small application of pressure, such as by allowing a portion thereof to contact a stop. An arm 29 extends from the link 29, and is adapted to contact a switch 42 to energize the clutch 26 when the shaft 19 is rotating counter-clockwise, and is adapted to be dragged upwardly to contact a switch 43 to energize the clutch 27 when the shaft 19 is rotating clockwise. Therefore, it will readily be seen that upon continuous rotation of the shaft 19 in one direction, only one of the clutch devices 26 or 27 will be engaged with its respective gear, and will accordingly drive the body 24 in one continuous direction. However, when reciprocating, the shaft 19 will drive the drag link 29 to alternately operate the clutches 26 and 27, and therefore always drive the gear 23 and driven body 24 in a single predetermined rotational direction.

In the Figure 3 of the drawing, I have illustrated a self-contained hydraulic clutch mechanism to interconnect the gears 21 and 22 with the shaft and thereby continuously drive the output gear 23 in a single predetermined direction. In this embodiment, a clutch and impeller for the gear 21 are enclosed within the housing 30, and a clutch and impeller for the gear 22 is contained within a housing 31. Each of the clutch mechanisms in the housing 30 and 31 may comprise generally a clutch which may be operated by a drive of hydraulic fluid in a predetermined direction. Thus, for example, impeller 32 is adapted to drive hydraulic fluid into clutch wheel 33 upon rotation of the shaft 19 in a counter-clockwise direction, and thereby interlock the gear 21 with the shaft 19 to rotate the output gear 23 in a clockwise direction. Conversely, impeller 34 is adapted to drive fluid into driving engagement with clutch wheel 35 upon rotation of the shaft 19 in a clockwise direction, and thereby drive the gear 22 in a clockwise direction. Therefore, the gear 23 is driven in a clockwise direction regardless of whether the shaft 19 is reciprocating or continuously rotating. Clutch means which require external control, for example the electrical clutches of Figure 2, may be controlled by the driven shaft 19, by the shaft driving crank 10, or some independent control mechanism. Thus, if controlled by the driving shaft, the output shaft 24 will be reversed as the pivot is moved from the position illustrated in Figure 1 to a position between crank 10 and crank 11.

In Figure 4 of the drawing I illustrate an alternate type of mechanism wherein the driven shaft 24 and the driving crank arm 10 extend substantially in parallel direction. Also, I illustrate a mechanical motion rectifying means. In this embodiment, the shaft 19 is provided with a sectional worm gear 41 at the end thereof. A shaft 36 is provided with a worm gear 37, and the shaft 36 also carries the bevel gears 21 and 22 previously discussed. In this embodiment, the crank arm 11 is always positioned relative to the pivot means 13 in order to produce reciprocating rotary motion in the shaft 19. Therefore, by the worm 41 and the worm gear 37, the shaft 36 will always be rotary reciprocating. In the mechanical motion rectifying means 20 illustrated in the Figure 4, the gear 21 is provided with a plurality of dog teeth 38 thereon. The gear 22 is also provided with similar teeth. A mechanical gear actuating device 39 is provided having non-rotative interlocking surfaces with the shaft 36 and is thereby longitudinally shiftable relative to the shaft but is locked to reciprocate with the shaft 36. I have illustrated mechanical shifting means by the dot-dash line 40. The mechanical shifting means illustrated by the dot-dash line 40 may comprise any suitable shifting apparatus, such, for example, as cam operated mechanism to shift the device 39 relative to the gear 21 and the gear 22 upon the shaft 36 dependent upon the direction of oscillatory rotation of the shaft 19. Therefore, when the shaft 19 is rotating about its longitudinal axis in a first direction, the shifting means 40 will move the actuating device 39 into engagement with the teeth 38 of the gear 21, and when the shaft 19 rotates in the opposite direction, the actuating means 39 will be moved to engage the gear 22. Therefore, it will readily be seen that the driven body shaft 24 will always be driven in a predetermined rotational direction by the oscillating shaft 19.

Although I have described my invention with a certain degree of particularity in its preferred form, it is understood that the present disclosure of the preferred form has been made only by way of example and that numerous changes in the details of construction and the combination and arrangement of parts may be resorted to without departing from the spirit and the scope of the invention as hereinafter claimed.

I claim:

1. A drive transfer mechanism, comprising an input shaft, an output shaft, means to drive said output shaft from said input shaft, means to vary the drive means for imparting a varying drive on said output shaft from a non-rotative condition through a progressively increasing rotary angular extent of oscillatory rotation to a continuously rotating condition, and motion rectifying means operably driven by said output shaft, including first gear means and second gear means freely rotatable on said output shaft, and output gear means in mesh with both said first and second gear means and adapted to be driven by either of the first and second gear means, first bidirectional clutch means adapted to drivingly interconnect said first gear and said output shaft, second bidirectional clutch means adapted to drivingly interconnect said second gear and said output shaft, and actuating means adapted to operate the first clutch means upon rotation of the output shaft in a first direction and adapted to operate said second clutch means upon rotation of the output shaft in a second direction.

2. A drive transfer mechanism, comprising a rotatable driving crank arm, a crank arm driven member, a swingable pivot arm power link, first interconnecting means slidably interconnecting said link and the driven crank arm, second interconnecting means slidably interconnecting said link and the crank arm of the driven member, pivot means to pivot said link, means to shift said pivot means from a first positional limit at one side of both said driving crank arm and driven crank arm a distance not greater than the position of a vertex of two similar triangles wherein the length of the driving crank arm and driven crank arm forms the bases of the two triangles, to a second positional limit relative to the second interconnecting means less than the distance to said first limit to thereby vary the driving influence of the pivot arm power link on the driven member from a minimum to a maximum, said driven member including motion rectifying means comprising a shaft driven by said driven crank arm, first and second gear means rotatably carried by said shaft, and output means in mesh with both said first and second gear means and adapted to be driven by either of the first and second gear means, first and second bidirectional clutch means, said first clutch means being actuatable to interconnect said shaft and said first gear means, said second clutch means being actuatable to interconnect said shaft and said second gear means, first hydraulic means adapted to actuate said first clutch upon rotation of the shaft in a first rotational direction, second hydraulic means adapted to actuate said second clutch upon rotation of the shaft in a second rotational direction, the drive transfer mechanism thereby being adapted to transfer power from said driving shaft to a driven member with substantially infinite variations from a minimum to a maximum speed by shifting the pivot means from said first limit to said second limit and thereby variably oscillate and rotate said driven member, and the said transfer mechanism converting oscillatory movements of the driven member into rotary movements, and transferring rotary movement as rotary movement.

3. A drive transfer mechanism, comprising a rotatable driving crank arm, a crank arm driven member, a swingable pivot arm power link, first interconnecting means slidably interconnecting said link and the driven crank arm, second interconnecting means slidably interconnecting said link and the crank arm of the driven member, pivot means to pivot said link, means to shift said pivot means from a first positional limit at one side of both said driving crank arm and driven crank arm a distance not greater than the position of a vertex of two similar triangles wherein the length of the driving crank arm and driven crank arm forms the bases of the two triangles, to a second positional limit relative to the second interconnecting means less than the distance to said first limit to thereby vary the driving influence of the pivot arm power link on the driven member from a minimum to a maximum, said driven member including motion rectifying means comprising a shaft driven by said driven crank arm, first and second gear means freely rotatable on said shaft, and output means in mesh with both said first and second gear means and adapted to be driven by either of the first and second gear means, first and second bidirectional electrical clutch means, electrical means adapted to energize said first clutch upon rotation of the shaft in a first rotational direction and thereby drivingly interconnect said first gear and said shaft, and electrical means adapted to energize said second clutch upon rotation of the shaft in a second rotational direction and thereby drivingly interconnect said second gear and said shaft, the drive transfer mechanism thereby being adapted to transfer power from said driving shaft to a driven member with substantially infinite variations from a minimum to a maximum speed by shifting the pivot means from said first limit to said second limit and thereby variably oscillate and rotate said driven member, and the said transfer mechanism converting oscillatory movements of the driven member into rotary movements, and transferring rotary movement as rotary movement.

4. I claim as my invention an infinite variable speed changing mechanism in combination, a rotatable driving crank arm, a slotted coupling link directly and slidably interconnected to said driving crank arm, said slotted coupling link being actuated by said rotatable driving crank arm, a rotatable driven crank shaft spaced from said driving crank arm, said intermediate crank shaft directly and slidably interconnected to and actuated by slotted coupling link, a shiftable pivot means spaced a distance from said driving crank arm and connected to the slotted coupling link to pivot said slotted coupling link for an oscillating movement, and means to adjust said pivot means for the purpose of varying the angular velocity of said intermediate crank shaft in relationship to the angular velocity of said driving crank arm by adjusting the axis of the pivot means closer to or farther from the axis of the intermediate crank shaft, two opposite facing and freely turning co-axially mounted bevel gears supported by said intermediate crank shaft, a driven shaft whose axis is non-parallel to the axis of said intermediate crank shaft, a driven bevel gear connected to the said driven shaft and placed in mesh between the two co-axially mounted gears, a suitable clutching device connected to said intermediate crank shaft and capable of selectively interconnecting either co-axially mounted gears depending upon the direction of motion of said intermediate crank shaft whereby the variable plane rotary or oscillating motion of said intermediate crank shaft is transmitted through said clutching means to a selected opposite turning co-axially mounted bevel gear which in turn actuates said driven shaft through said bevel gear in any predetermined direction or predetermined variable speed according to relative position of the slotted coupling link and intermediate crank shaft and according to which one of said co-axial bevel gears is acting as driver for said driven bevel gear.

5. An infinitely variable drive mechanism, comprising a rotatable driving shaft having a crank arm, a rotatable driven shaft having a crank arm, said rotatable driven shaft being spaced in parallel relationship from said driving shaft, a power link interconnecting said crank arms, means to slidably interconnect said driving crank and said power link, means to slidably interconnect said driven crank and said power link, pivot means to pivot said power link for swinging movement, said pivot means being movable relative to said driving and driven shafts along a straight line path parallel to a common perpendicular to the axes of said driving shaft and driven shaft, said pivot means being movable between a first limit and a second limit, said first limit being a distance from the axis of said driven shaft equal to the length of the crank arm thereof and thereby providing substantially no rotary movement of the driven crank arm, said second limit being spaced a distance from the axis of the driven shaft equal to the hypotenuse of a right triangle wherein the length of the driven crank arm is equal to the base, the right triangle being a similar triangle of a right triangle wherein the distance from the second limit to the axis of the driving shaft is equal to the hypotenuse and the length of the driving crank arm is equal to the base, the pivot being a vertex common to both triangles, whereby the pivot means may be moved to vary the rotary angular oscillatory extent from zero movement until the driven crank arm ceases to be oscillatory rotating and begins to rotate continuously.

6. An infinitely variable drive mechanism, comprising a rotatable driving shaft having a crank arm, a rotatable driven shaft having a crank arm, said rotatable driven shaft being spaced in parallel relationship from said driving shaft, a power link interconnecting said crank arms, means to slidably interconnect said driving crank and said power link, means to slidably interconnect said driven crank and said power link, pivot means to pivot said power link for swinging movement, said pivot means being movable relative to said driving and driven shafts along a straight line path parallel to a common perpendicular to said driving shaft and driven shaft, said pivot means being movable between a first limit and a second limit, said first limit being a distance from the axis of said driven shaft equal to the length of the crank arm thereof and thereby providing substantially no rotary movement of the driven crank arm, said second limit being spaced a distance from the driven shaft equal to the hypotenuse of a right triangle wherein the length of the driven crank arm is equal to the base, the right triangle being a similar triangle of a right triangle wherein the distance from the second limit to the driving shaft is equal to the hypotenuse and the length of the driving crank arm is equal to the base, the pivot being a vertex common to both triangles, whereby the pivot means may be moved to vary the rotary angular oscillatory extent from zero movement until the driven crank arm ceases to be oscillatory rotation and begins to rotate continuously, and means driven by said driven crank arm to convert oscillatory movements into a selected type of movement including uniform and irregular, as well as change of rate in output speed either harmonic or unharmonic in a clockwise or counterclockwise direction.

7. A drive transfer mechanism comprising a pivot arm power link, pivot means to pivot said link, drive means to swingably drive said link about said pivot means, driven means adapted to be oscillatorily and rotatably driven by said link, hydraulic means to shift said pivot means relative to the driven means to thereby vary the driving influence of the pivot arm power link on the driven means, said hydraulic means to shift said pivot means being adapted to move the pivot means any preselected number of times during cycle of swing of the power link to thereby produce a preselected type of movement of the driven means, and motion rectifying means operably driven by said driven means, including first gear means and second gear means freely rotatably mounted relative to said driven means, and output gear means in mesh with both said first and second gear means and adapted to be driven by either of the first and second gear means, first bidirectional clutch means adapted to drivingly interconnect said first gear and output gear with said driven means second bidirectional clutch means adapted to drivingly interconnect said second gear and ouput gear with said driven means, and actuating means adapted to selectively operate the first and second clutch means to engage one of said clutches at a preselected period in relation to the movement of the driven means to produce a selected type of movement including uniform and irregular, as well as change of rate in output speed either harmonic or unharmonic in a clockwise or counterclockwise direction.

8. A motion convertor for a drive transfer mechanism wherein an intermediate crank shaft is selectively and adjustably driven in a range of rotary angular oscillatory movement, said range extending from a first limit of zero movement through progressively greater rotary angular oscillatory movement to a second limit of continuously rotational movement, said motion convertor comprising a shaft portion driven by said crank shaft, first and second bevel gear means rotatably mounted on said shaft portion, means to hold said first and second gear means against longitudinal movement on said shaft portion, a driven output shaft having a driven pinion gear, means to mount said driven gear to mesh with both said first and second bevel gears, said first and second bevel gears and pinion thereby being interlocked as a gear unit and remaining together in constant speed ratio at all times, clutching means carried by said shaft portion adapted to interconnect a selected one of said first or second bevel gears with said shaft portion in nonrotative drive relationship to drive the gear unit in a selected rotational direction, and means to actuate said clutching means in timed relationship with respect to the rotational movement of said shaft portion and interconnect said first and second bevel gears with said shaft portion only when said shaft and gear are turning in the same direction, whereby said gear unit and output shaft will be driven in a selected rotational direction with either a uniform or an irregular velocity.

9. A variable drive unit for a drive transfer mechanism wherein the drive unit is adapted to selectively and adjustably drive an intermediate crank shaft in a range of rotary angular oscillatory movement, said range extending from a first limit of zero movement through progressively greater rotary angular oscillatory movement to a second limit of continuously rotating movement, and wherein a motion conversion means is adapted to convert the oscillating movement of the intermediate crank shaft into a preselected type of movement including uniform and irregular, as well as change of rate in output speed either harmonic or unharmonic in a clockwise or counterclockwise direction, said variable drive unit comprising, a rotatable driving shaft having a crank arm, a rotatable driven shaft having a crank arm spaced from said driving shaft, a power link interconnecting said crank arms, pivot means to pivot said power link for swinging movement, said pivot means being adapted to shift said power link relative to said driving and driven crank arms to adapt the power link as a shiftable pivotable swinging power linkage between said crank arms, said pivot means being movable from a position on one side of said driven crank arm opposite said driving crank arm to a position between said crank arms, and means to move said power link to a predetermined number of positions during one swinging cycle of the power link to thereby provide any desired type of movement of said intermediate crank shaft.

10. A variable mechanical torque converter comprising, a power link, pivot means to pivot said power link for swinging movement, a rotatable driven shaft having a crank arm, power means to swingably drive said power link with a swinging movement about said pivot means, said power link and driven crank arm being interconnected and driving said driven shaft from said power means through said power link, means to shift said pivot means and vary the leverage action of the power link on the driven crank arm, first and second bevel gears freely rotatable on said driven shaft, an output shaft having a pinion in constant mesh with both said first and second bevel gears, first bidirectional clutch means actuatable to interconnect said first bevel gear and said driven shaft, and second bidirectional clutch means actuatable to interconnect said second bevel gear and said driven shaft.

11. A variable mechanical torque converter comprising, a power link, pivot means to pivot said power link for swinging movement, a rotatable driven shaft having a crank arm, power means to swingably drive said power link with a swinging movement about said pivot means, said power link and driven crank arm being interconnected and driving said driven shaft from said power means through said power link, means to shift said pivot means and vary the leverage action of the power link on the driven crank arm, first and second bevel gears freely rotatable on said driven shaft, an output shaft having a pinion in constant mesh with both said first and second bevel gears, first bidirectional clutch means actuatable to interconnect said first bevel gear and said driven shaft, second bidirectional clutch means actuatable to interconnect said second bevel gear and said driven shaft, and clutch control means selectively actuating said first and second bidirectional clutch means to keep one of said bevel gears engaged with said driven shaft substantially at all times.

12. A variable mechanical torque converter comprising, a power link, pivot means to pivot said power link for swinging movement, a rotatable driven shaft having a crank arm, power means to swingably drive said power link with a swinging movement about said pivot means, said power link and driven crank arm being interconnected and driving said driven shaft from said power means through said power link, means to shift said pivot means and vary the leverage action of the power link on the driven crank arm, first and second drive members freely rotatable on said driven shaft, an output shaft, gear train linkage means connecting said first and second drive members and said output shaft in linked relationship for opposite directional rotation of said first and second drive members, said drive members being in bidirectional driving engagement with said output shaft at all times, first bidirectional clutch means actuatable to interconnect said first drive member and said driven shaft, and second bidirectional clutch means actuatable to interconnect said second drive member and said driven shaft.

13. In an infinitely variable drive mechanism having a power link, pivot means to pivot said power link for swinging movement, a rotatable driven shaft having a crank arm, power means to swingably drive said power link with a swinging movement about said pivot means, said power link and driven crank arm being interconnected and driving said driven shaft from said power means through said power link, and having means to shift said pivot means and vary the leverage action of the power link on the driven crank arm, the provision of motion conversion means driven by said driven shaft to convert oscillatory driven shaft motion to continuously rotating motion and to transmit continuously rotating driven shaft motion unaltered, said motion conversion means comprising, first and second bevel gears freely rotatable on said driven shaft, an output shaft having a pinion in constant mesh with both said first and second bevel gears, first bidirectional clutch means actuatable to interconnect said first bevel gear and said driven shaft, and second bidirectional clutch means actuatable to interconnect said second bevel gear and said driven shaft.

14. In an infinitely variable drive mechanism having a power link, pivot means to pivot said power link for swinging movement, a rotatable driven shaft having a crank arm, power means to swingably drive said power link with a swinging movement about said pivot means, said power link and driven crank arm being interconnected and driving said driven shaft from said power means through said power link, and having means to shift said pivot means and vary the leverage action of the power link on the driven crank arm, the provision of motion conversion means driven by said driven shaft to convert oscillatory driven shaft motion to continuously rotating motion and to transmit continuously rotating driven shaft motion unaltered, said motion conversion means comprising, first and second bevel gears freely rotatable on said driven shaft, an output shaft having a pinion in constant mesh with both said first and second bevel gears, first bidirectional clutch means actuatable to interconnect said first bevel gear and said driven shaft, second bidirectional clutch means actuatable to interconnect said second bevel gear and said driven shaft, said first and second clutch means being engageable at any rotary position, and means for actuating a selected one of said bidirectional clutch means in timed relationship to the direction of said driven shaft, but with one of said clutch members engaged at substantially all times, whereby the two bevel gears will turn in opposite directions because of their linkage through the connecting pinion, and will be engaged with the shaft instantly upon rotation of the shaft in the direction of rotation of the said bevel gear.

15. An infinitely variable drive mechanism, comprising a rotatable driving shaft having a crank arm, a rotatable driven shaft having a crank arm, said rotatable driven shaft being spaced in parallel relationship from said driving shaft, a power link interconnecting said crank arms, means to slidably interconnect said driving crank and said power link, means to slidably interconnect said driven crank and said power link, pivot means to pivot said power link for swinging movement, said pivot means being movable relative to said driving and driven shafts along a straight line path parallel to a common perpendicular to said driving shaft and driven shaft, said pivot means being movable between a first limit and a second limit, said first limit being a distance from the axis of said driven shaft equal to the length of the crank arm thereof and thereby providing substantially no rotary movement of the driven crank arm, said second limit being spaced a distance from the driven shaft equal to the hypotenuse of a right triangle wherein the length of the driven crank arm is equal to the base, the right triangle being a similar triangle of a right triangle wherein the distance from the second limit to the driving shaft is equal to the hypotenuse and the length of the driving crank arm is equal to the base, the pivot being a vertex common to both triangles, whereby the pivot means may be moved to vary the rotary angular oscillatory extent from zero movement until the driven crank arm ceases to be oscillatory rotation and begins to rotate continuously, first and second bevel gears freely rotatable on said driven shaft, an output shaft having a pinion in constant mesh with both said first and second bevel gears, first bidirectional clutch means actuatable to interconnect said first bevel gear and said driven shaft, second bidirectional clutch means actuatable to interconnect said second bevel gear and said driven shaft.

GEORGE W. WILLARD.

REFERENCES CITED

The following references are of record in the file of this patent:

UNITED STATES PATENTS

| Number | Name | Date |
|---|---|---|
| 490,754 | Radovanovic | Jan. 31, 1893 |
| 1,432,853 | Hanson | Oct. 24, 1922 |
| 1,516,734 | Johnson | Nov. 25, 1924 |

FOREIGN PATENTS

| Number | Country | Date |
|---|---|---|
| 102,171 | Austria | Dec. 28, 1925 |
| 355,976 | France | Sept. 18, 1905 |
| 779,688 | France | Jan. 19, 1935 |
| 855,859 | France | Feb. 26, 1940 |
| 267,381 | Great Britain | Mar. 17, 1927 |
| 331,601 | Italy | Nov. 11, 1935 |